United States Patent
Iwasaki

(10) Patent No.: US 12,158,311 B2
(45) Date of Patent: Dec. 3, 2024

(54) FIN OF HEAT EXCHANGER, METHOD FOR MANUFACTURING THE SAME, HEAT EXCHANGER, AND AIR CONDITIONING APPARATUS

(71) Applicant: DAIKIN INDUSTRIES, LTD., Osaka (JP)

(72) Inventor: Mami Iwasaki, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 391 days.

(21) Appl. No.: 17/289,142

(22) PCT Filed: Oct. 25, 2019

(86) PCT No.: PCT/JP2019/042007
§ 371 (c)(1),
(2) Date: Apr. 27, 2021

(87) PCT Pub. No.: WO2020/090677
PCT Pub. Date: May 7, 2020

(65) Prior Publication Data
US 2021/0389058 A1    Dec. 16, 2021

(30) Foreign Application Priority Data
Oct. 29, 2018 (JP) .................... 2018-202646

(51) Int. Cl.
*F28F 1/00* (2006.01)
*F28F 1/32* (2006.01)
*F28F 21/08* (2006.01)

(52) U.S. Cl.
CPC ............ *F28F 1/325* (2013.01); *F28F 21/084* (2013.01); *F28F 2215/08* (2013.01); *F28F 2245/04* (2013.01)

(58) Field of Classification Search
CPC .... F28F 1/32; F28F 21/08; F28F 1/325; F28F 2245/04; F28F 2215/08; F28F 21/084;
(Continued)

(56) References Cited

U.S. PATENT DOCUMENTS

2005/0082051 A1    4/2005    Hashimoto et al.
2013/0098591 A1    4/2013    Taras et al.
(Continued)

FOREIGN PATENT DOCUMENTS

CN    104075608 A   *   10/2014
EP       2119996 A1       11/2009
(Continued)

OTHER PUBLICATIONS

International Search Report issued in corresponding International Patent Application No. PCT/JP2019/042007, mailed Dec. 10, 2019, with translation (5 pages).
(Continued)

*Primary Examiner* — Harry E Arant
(74) *Attorney, Agent, or Firm* — Osha Bergman Watanabe & Burton LLP

(57) ABSTRACT

A fin of a heat exchanger includes: a substrate including aluminum or an aluminum alloy, the substrate including a plurality of holes or a plurality of cutout portions in which a plurality of heat transfer tubes are to be disposed respectively; and an organic layer disposed on an end face of the substrate.

24 Claims, 10 Drawing Sheets

(58) Field of Classification Search
CPC ........ F28F 19/04; F28F 2275/125; F24F 1/18; F28D 2021/0063
See application file for complete search history.

(56) References Cited

U.S. PATENT DOCUMENTS

| | | | |
|---|---|---|---|
| 2014/0366568 | A1 | 12/2014 | Kim et al. |
| 2015/0260436 | A1 | 9/2015 | Kim et al. |
| 2018/0306533 | A1 | 10/2018 | Alahyari et al. |

FOREIGN PATENT DOCUMENTS

| | | | | |
|---|---|---|---|---|
| EP | 2413085 | A1 * | 2/2012 | ............... B05D 7/54 |
| JP | 106146877 | A | 5/1994 | |
| JP | H0829095 | A * | 2/1996 | |
| JP | 2005098666 | A | 4/2005 | |
| JP | 2007071526 | A * | 3/2007 | |
| JP | 2009074775 | A | 4/2009 | |
| JP | 2010223514 | A | 10/2010 | |
| JP | 2013100933 | A * | 5/2013 | |
| JP | 2018-115836 | A | 7/2018 | |
| JP | 6530178 | B2 * | 6/2019 | |
| KR | 100991458 | B1 | 11/2010 | |
| KR | 1020150106230 | A | 9/2015 | |
| WO | 2008088217 | A2 | 7/2008 | |

OTHER PUBLICATIONS

Extended European Search Report issued in corresponding European Patent Application No. 19879980.1 dated Nov. 10, 2021 (7 pages).
International Preliminary Report on Patentability issued for PCT/JP2019/042007, issued Apr. 27, 2021 (14 pages).

* cited by examiner

FIN OF HEAT EXCHANGER, METHOD FOR MANUFACTURING THE SAME, HEAT EXCHANGER, AND AIR CONDITIONING APPARATUS

TECHNICAL FIELD

The present disclosure relates to a fin of a heat exchanger, the fin including aluminum or an aluminum alloy and an organic layer disposed on the surface.

BACKGROUND

In an aluminum fin for use in a heat exchanger of an air conditioning apparatus, a corrosion-resistant film layer is formed on the surface of an aluminum base material in order to enhance corrosion resistance of aluminum (for example, see Patent Literature 1 (JP 2010-223514 A)).

PATENT LITERATURE

Patent Literature 1: JP 2010-223514 A

After the formation of a corrosion-resistant coating layer on an aluminum base material, the base material is conventionally cut to the size of a fin. Thus, the cut face is not coated with the corrosion-resistant coating layer, and as a result, the heat exchanger has a surface having a portion where no coating layer is formed. In regions suffering from severe salt damage, if a heat exchanger has a surface having a portion where no corrosion-resistant coating layer is formed, there is a possibility that corrosion will proceed from the portion.

SUMMARY

A fin of a heat exchanger according to one or more embodiments including a substrate and an organic layer. The substrate includes aluminum or an aluminum alloy. The substrate has a plurality of holes or a plurality of cutout portions in which a plurality of heat transfer tubes are to be disposed respectively. The organic layer is disposed on an end face of the substrate.

In the fin of the heat exchanger, according to one or more embodiments, the effect of preventing corrosion of the substrate is large because of the organic layer disposed on the end face of the substrate.

In one or more embodiments, the organic layer is disposed also on a surface of the substrate, the surface continuous from the end face of the substrate.

In the fin of the heat exchanger, according to one or more embodiments, the effect of preventing corrosion of the substrate is further large because of the organic layer disposed also on the surface of the substrate.

In one or more embodiments, the organic layer has a film thickness of 10 μm or more and 300 μm or less on the surface of the substrate. Here, the film thickness of the organic layer on the surface of the substrate is defined as the thickness of the thickest portion on the surface of the substrate of one fin arbitrarily extracted from a plurality of stacked fins excluding the fin at the end portion.

In the fin of the heat exchanger, according to one or more embodiments, the effect of preventing corrosion of the substrate is large because of the thick organic layer disposed on the surface of the substrate.

In one or more embodiments, the organic layer has a first organic layer. The first organic layer includes a hydrophobic organic substance. The word "hydrophobic" means, for example, to have a contact angle with water of 50° or more. The first organic layer has a thickness of 10 μm or more and 200 μm or less.

In one or more embodiments, the fin of the heat exchanger has a high effect of preventing corrosion when the heat exchanger is used as a condenser because of the hydrophobic first organic layer of the organic layer.

In one or more embodiments, the first organic layer is one resin or a combination of resins selected from the group consisting of polyurethane-based resins, acrylic-based resins, fluorine-based resins, and polyester-based resins.

In one or more embodiments, the first organic layer is a polyurethane-based resin.

In one or more embodiments, the fin of the heat exchanger has excellent weather resistance because of the polyurethane-based resin used as the first organic layer.

In one or more embodiments, the organic layer further has a second organic layer. The second organic layer is disposed between the first organic layer and the substrate. The second organic layer is a hydrophobic epoxy-based or epoxy-zinc-based resin.

In one or more embodiments, the second organic layer in the fin of the heat exchanger improves the adhesiveness between the first organic layer and the substrate.

In one or more embodiments, the second organic layer has a thickness of 5 μm or more and 40 μm or less.

In one or more embodiments, the organic layer further has a third organic layer. The third organic layer is disposed on the surface of the substrate and is disposed between the second organic layer and the substrate. The third organic layer is one resin or a combination of resins selected from the group consisting of epoxy-based resins, urethane-based resins, polyester-based resins, acrylic-based resins, and fluorine-based resins.

In one or more embodiments, the second organic layer and the first organic layer are disposed on the end face of the substrate in order from a substrate side, and the third organic layer, the second organic layer, and the first organic layer are disposed on the surface of the substrate in order from the substrate side. Furthermore, the second organic layer and the first organic layer continuously cover the end face of the substrate and a surface of the third organic layer.

In one or more embodiments, the end face of the substrate is disposed on a windward side.

In one or more embodiments, corrosion of the substrate is effectively prevented because of the organic layer disposed on the end face on the windward side of the substrate.

In one or more embodiments, the substrate further has a fin collar. The fin collar is disposed around each of the plurality of holes or at a periphery of each of the plurality of cutout portions of the substrate. The fin collar extends in one direction perpendicular to the surface of the substrate. The organic layer is disposed on at least a part of an end face of the fin collar.

In one or more embodiments, corrosion of the substrate is effectively prevented because of the organic layer disposed on the end face of the fin collar.

In one or more embodiments, a heat exchanger including a composite having a plurality of the fins according to any one of the above-embodiments and a plurality of heat transfer tubes integrated with the fins. The plurality of heat transfer tubes respectively pass through the plurality of holes or the plurality of cutout portions of each of the plurality of the fins. The heat exchange includes a plurality of rows of composites on each of an upstream side and a downstream side of an air flow. The organic layer has an average thickness of 10 μm or more on an uppermost stream side (i.e., the most upstream side of the air flow), and has an average thickness of 10 μm or less on the most leeward side.

The heat exchanger according to the thirteenth aspect can efficiently exhibit an effect of preventing corrosion of the substrate because the organic layer included in the upstream fin has a large thickness, and the organic layer included in the downstream fin has a small thickness.

An air conditioning apparatus according to one or more embodiments includes the heat exchanger according to one or more embodiments, and a fan. The fan is configured to feed air to the heat exchanger. The heat exchanger is used for an outdoor unit.

The air conditioning apparatus according to one or more embodiments has a great effect of preventing corrosion of the substrate even when used as a heat exchanger of an outdoor unit that is easily affected by salt damage.

A method for manufacturing a fin of a heat exchanger according to one or more embodiments includes the steps of: (a) preparing a metal plate; (b) cutting the metal plate into a substrate; and (c) forming an organic layer on a surface and a cut face of the substrate. The metal plate includes aluminum or an aluminum alloy. Since the organic layer is formed on the substrate obtained by cutting the metal plate, the cut face is protected by the organic layer to exhibit an effect of preventing corrosion.

In one or more embodiments, the metal plate further includes a third organic layer. The third organic layer is applied to a surface of the aluminum or the aluminum alloy.

In one or more embodiments, the method includes, after the step (a) and before the step (c), the step (d) of forming a plurality of holes or a plurality of cutout portions in the substrate.

In one or more embodiments, the method includes, after the step (d) and before the step (c), the step (e) of forming a plurality of fin collars in the substrate.

In one or more embodiments, the method includes, after the step (e) and before the step (c), the step (f) of inserting a heat transfer tube in each of the plurality of holes and expanding the heat transfer tube to integrate the fin and the heat transfer tube.

In one or more embodiments, the method includes, after the step (f) and before the step (c), the step (g) of bending the heat transfer tube integrated with the fin.

In one or more embodiments, the organic layer in the step (c) has a hydrophobic first organic layer on an outermost surface.

In one or more embodiments, the first organic layer is one resin or a combination of resins selected from the group consisting of polyurethane-based resins, acrylic-based resins, fluorine-based resins, and polyester-based resins.

In one or more embodiments, the organic layer is formed on the surface thicker on a windward side of the substrate than on a leeward side of the substrate.

In one or more embodiments, the organic layer on the surface on the windward side of the substrate has a thickness of 10 μm or more and 300 μm or less.

DETAILED DESCRIPTION (1) Overall Configuration

Figure 1:
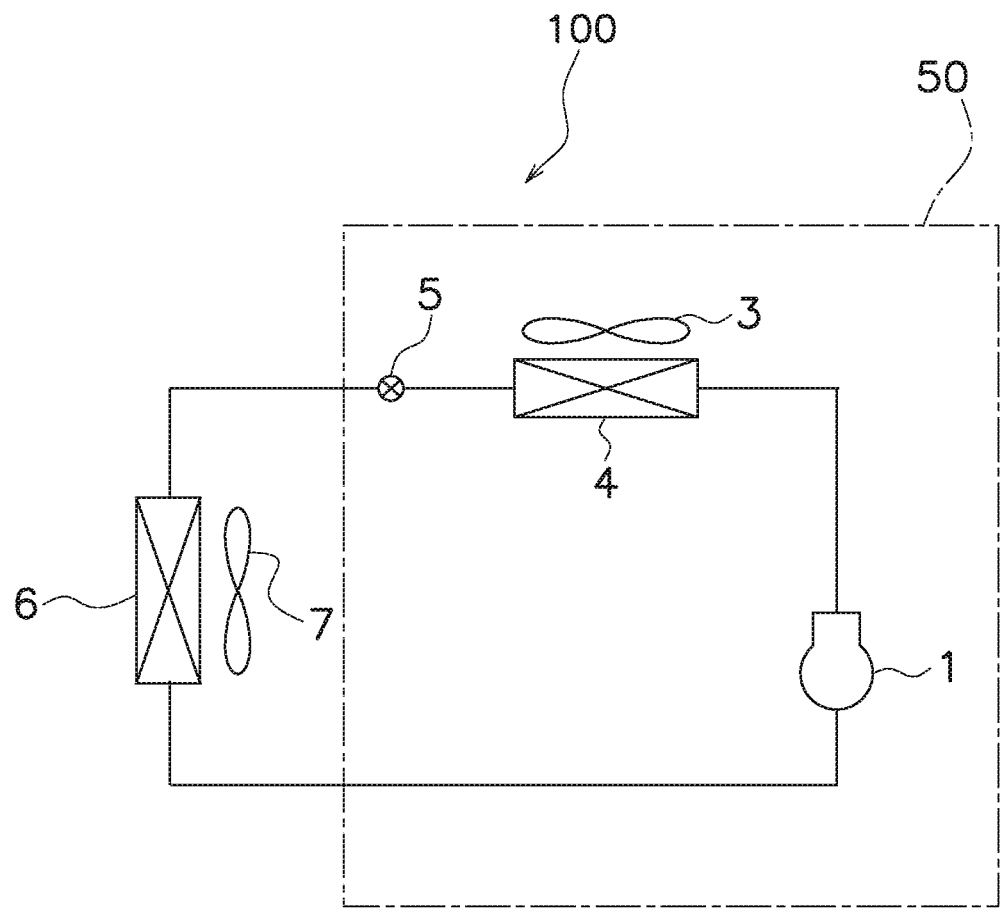
FIG. 1 is a refrigerant circuit diagram of an air conditioning apparatus 100 according to one or more embodiments.
Figure 2A:
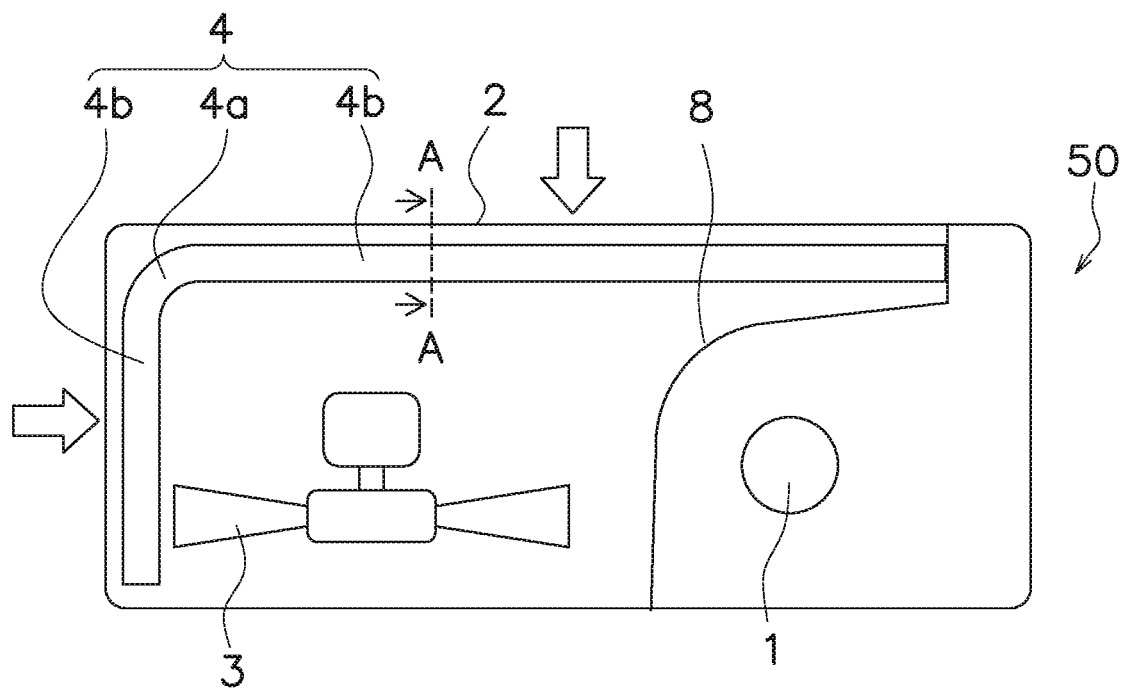
FIG. 2A is a schematic top view of an outdoor unit 50 according to one or more embodiments.
Figure 2A:
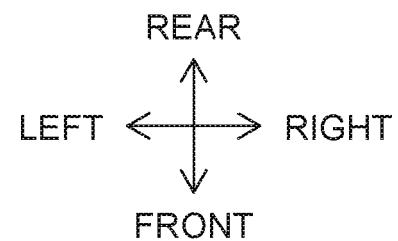
Figure 2B:
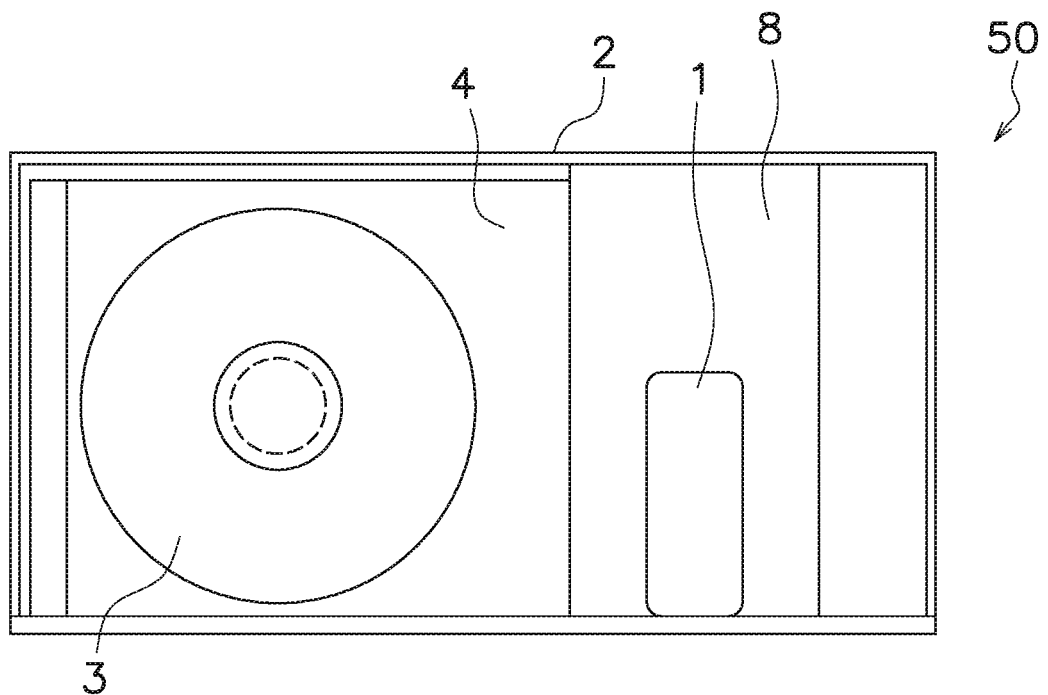
FIG. 2B is a schematic front view of the outdoor unit 50 according to one or more embodiments.

FIG. 1 illustrates a refrigerant circuit of an air conditioning apparatus 100 according to one or more embodiments. FIGS. 2A and 2B each schematically illustrate an outdoor unit 50 of the air conditioning apparatus 100 according to one or more embodiments. FIG. 2A is a top view illustrating the top of the outdoor unit 50. FIG. 2B is a front view (side view) illustrating the front of the outdoor unit 50. In FIG. 2A, the front, rear, left, and right sides are indicated by an arrow. In FIG. 2B, the upper, lower, left, and right sides are indicated by an arrow.

The refrigerant circuit in the air conditioning apparatus 100 according to one or more embodiments includes a compressor 1, a heat exchanger 4 (condenser), an expansion valve 5, and a heat exchanger 6 (evaporator) as shown in FIG. 1. The outdoor unit 50 according to one or more embodiments is divided by a partition plate 8 into a machine chamber illustrated on the right side of FIG. 2A and a heat exchange chamber illustrated on the left side of FIG. 2A. The compressor 1 and the expansion valve 5 are disposed in the machine chamber. The heat exchanger 4 (condenser) and a fan 3 configured to feed air to the heat exchanger 4 are disposed in the heat exchange chamber. An indoor unit (not illustrated) according to one or more embodiments includes the heat exchanger 6 (evaporator) and a fan 7 configured to feed air to the heat exchanger 6. In one or more embodiments, each of the two heat exchangers is not configured to serve as a condenser or an evaporator in a switchable manner by changing a flow of a refrigerant. In other words, the air conditioning apparatus according to one or more embodiments is a cooling-only air conditioning apparatus.

In the outdoor unit 50 in the air conditioning apparatus 100 according to one or more embodiments, the outdoor heat exchanger 4 (condenser), the fan 3 configured to feed air to the heat exchanger 4, and the compressor 1 are disposed in a casing 2 as shown in FIG. 2A or 2B. The casing 2 has, in its rear face, left side face, and front face, holes through which air is passable. When the fan 3 rotates, air is taken into the casing through the hole in the rear or left side face of the casing. The air exchanges heat with the refrigerant while passing through the heat exchanger 4. The air is then discharged from the casing through the hole in the front face of the casing.

(2) Outdoor Heat Exchanger 4

Figure 3:
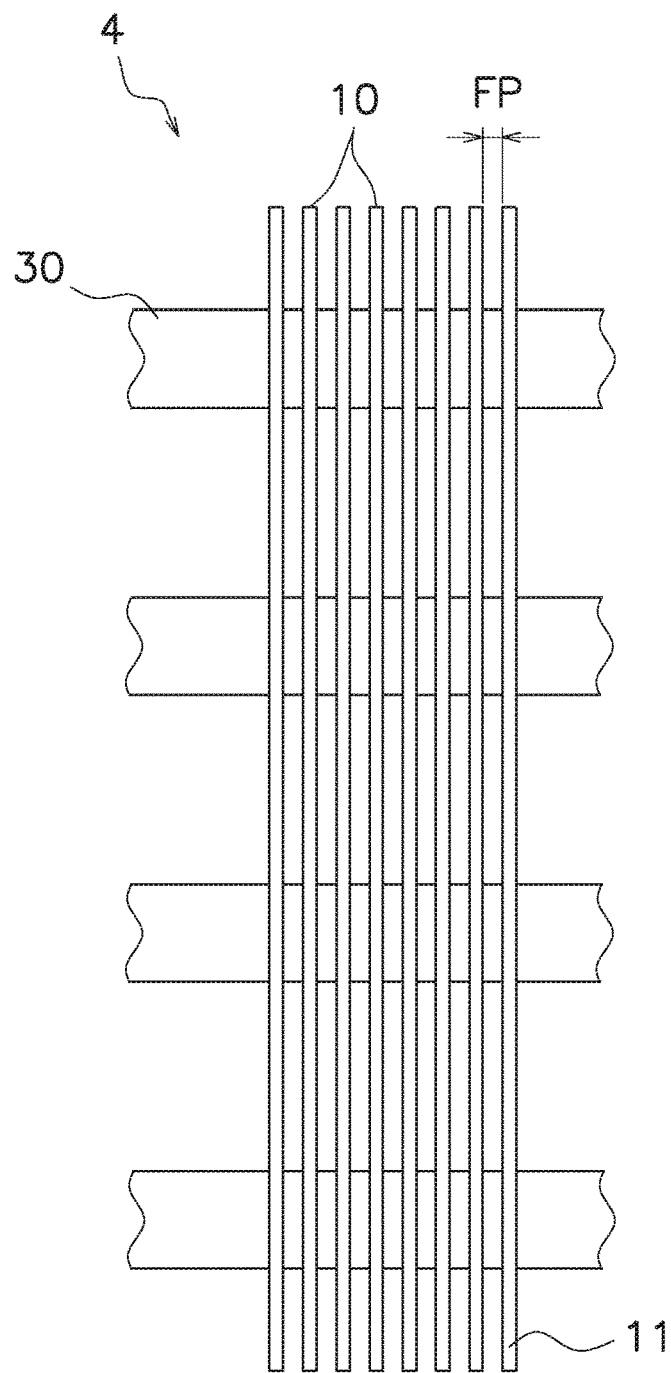
FIG. 3 is a side view of a heat exchanger 4 according to one or more embodiments.
Figure 4:
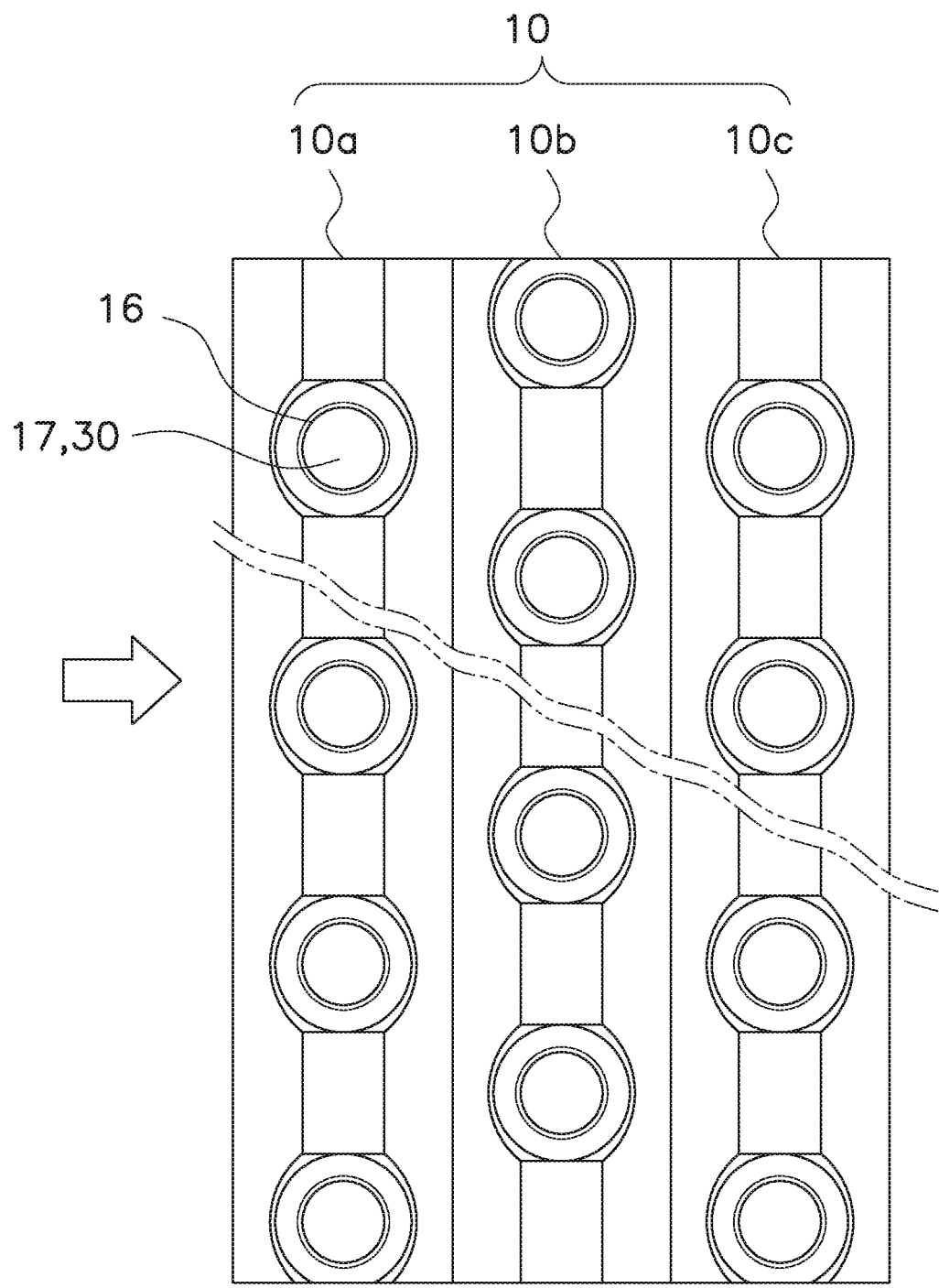
FIG. 4 is a plan view of an arrangement of fins 10a to 10c of a heat exchanger according to one or more embodiments.

FIG. 2A is a schematic top view of the outdoor heat exchanger 4 (condenser) according to one or more embodiments. FIG. 2B is a schematic front view of the outdoor heat exchanger 4. FIG. 3 is a side view of a part of the outdoor heat exchanger 4. FIG. 4 shows an arrangement of fins 10a to 10c. This fin is a so-called waffle fin.

The heat exchanger 4 according to one or more embodiments includes a plurality of heat transfer tubes 30 and a plurality of fins 10. The plurality of heat transfer tubes 30 each allow the refrigerant to flow therethrough. The plurality of fins 10 each have a plurality of holes 17 and are in contact with the plurality of heat transfer tubes 30 inserted in the plurality of holes 17. The plurality of fins 10 each promote heat exchange between the refrigerant and air.

The heat exchanger 4 has linear portions 4b respectively disposed along the left side face and the rear face of the casing 2, and a curved portion 4a between the linear portions 4b. The heat exchanger 4 has an L shape as a whole. The plurality of heat transfer tubes 30 have almost the same shape. Each of the plurality of heat transfer tubes 30 includes a metal. Each of the plurality of heat transfer tubes 30 includes aluminum or copper as a main material.

The sectional view of FIG. 4 illustrates the heat exchanger 4 taken along line A-A in FIG. 2A. FIG. 4 illustrates an arrangement of fins 10a to 10c. In one or more embodiments, the fin 10a, the fin 10b, and the fin 10c are arranged in three rows from a windward side to a leeward side in that order. The fins may be arranged in one row or two rows in accordance with a heat exchange amount.

The fins 10a and 10c have the same shape. The fin 10b has basically the same shape, but in the height direction, the heat transfer tubes 30 adjacent to the fin 10b are each arranged at an intermediate height between one heat transfer tube 30 and a next heat transfer tube 30 among the heat transfer tubes 30 adjacent to the fin 10a or 10c.

The fin 10a has holes 17 in which the heat transfer tubes 30 are inserted respectively, and the number of the holes 17 is, for example, 20 to 70.

The fin 10a has a width of, for example, 10 mm or more and 200 mm or less.

The fin pitch FP is, for example, 0.5 mm or more and 4.00 mm or less. In one or more embodiments, the fin pitch may be 1.3 mm or more and 1.7 mm or less.

(3) Fin 10a

Figure 5:
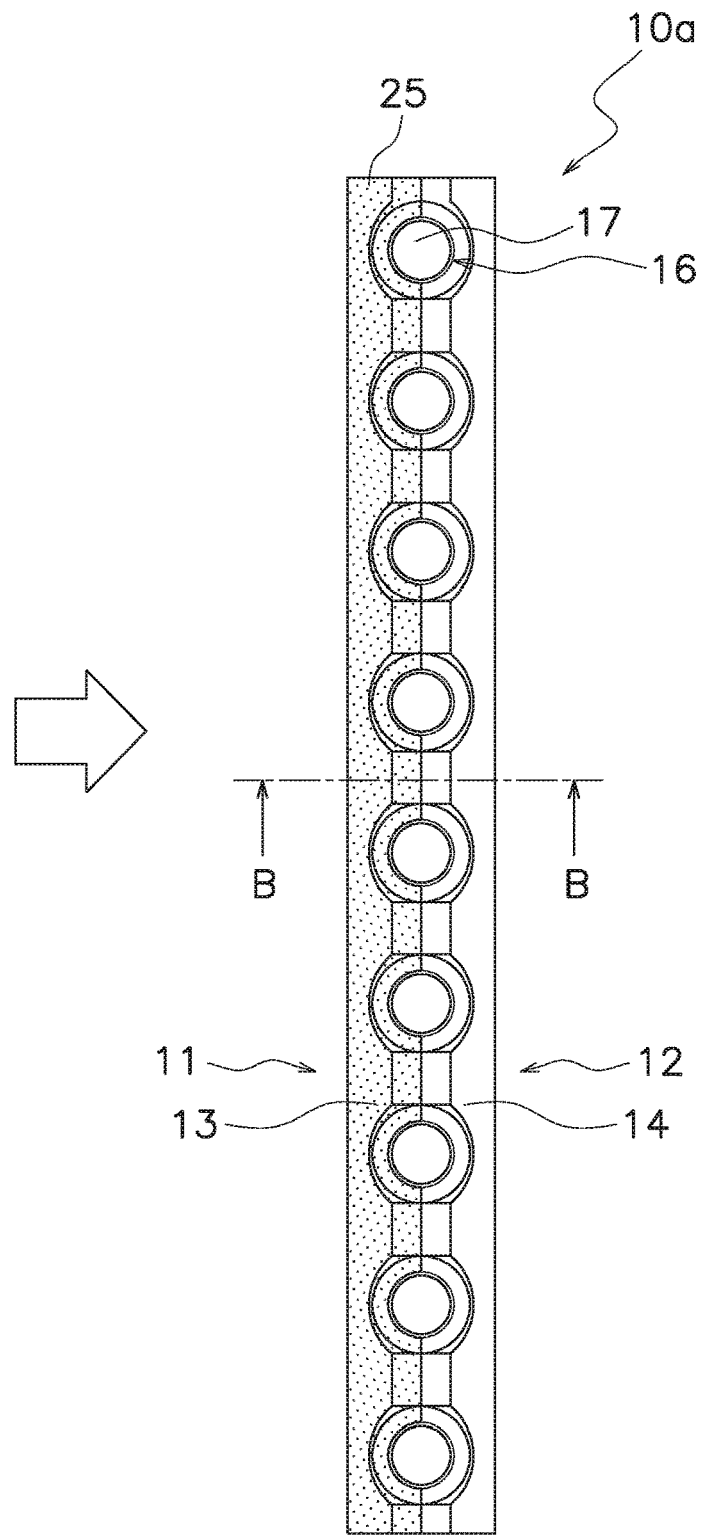
FIG. 5 is a schematic plan view of the fin 10a of the heat exchanger according to one or more embodiments.
Figure 6:
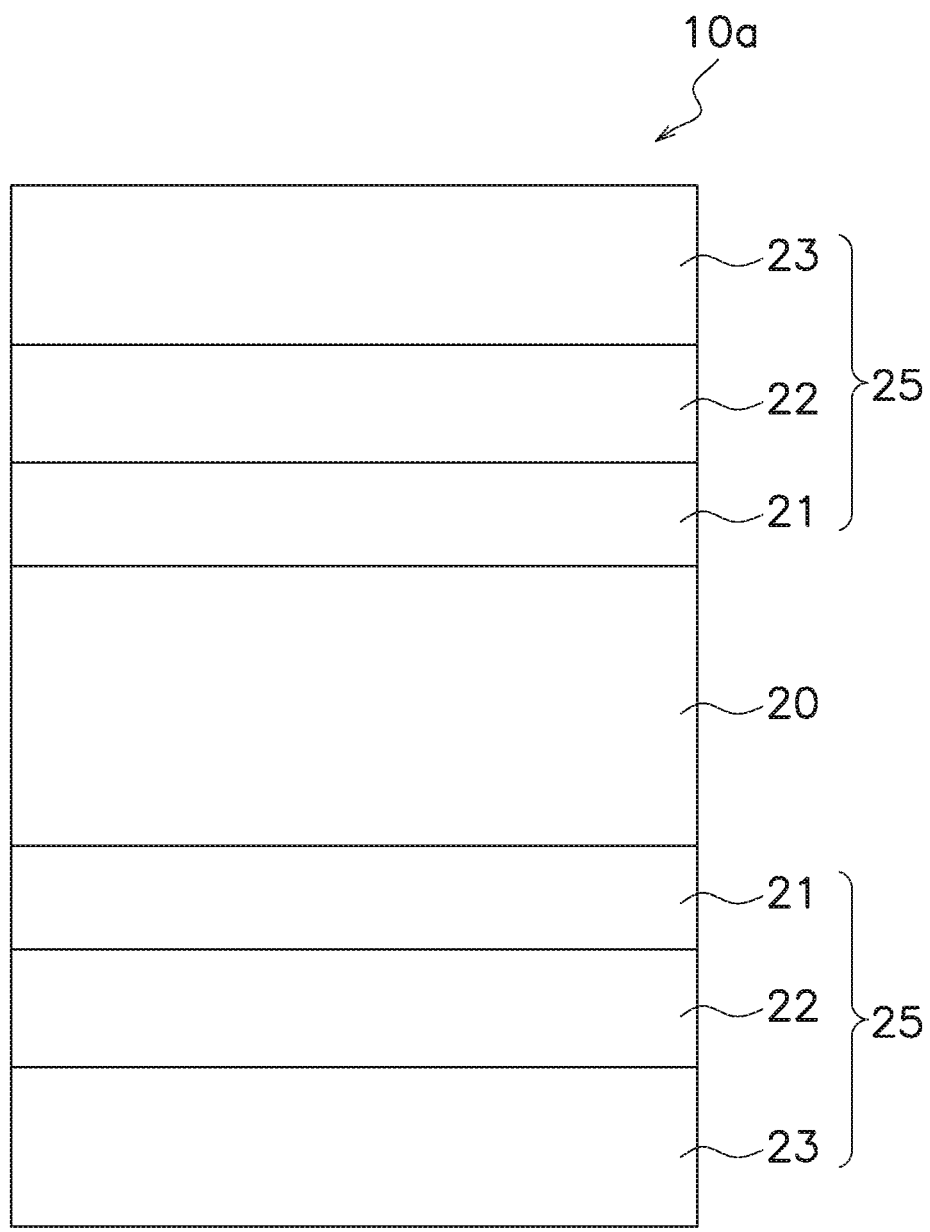
FIG. 6 is a sectional view of a schematic configuration of an organic layer 25 of the fin 10a of the heat exchanger according to one or more embodiments.
Figure 7:
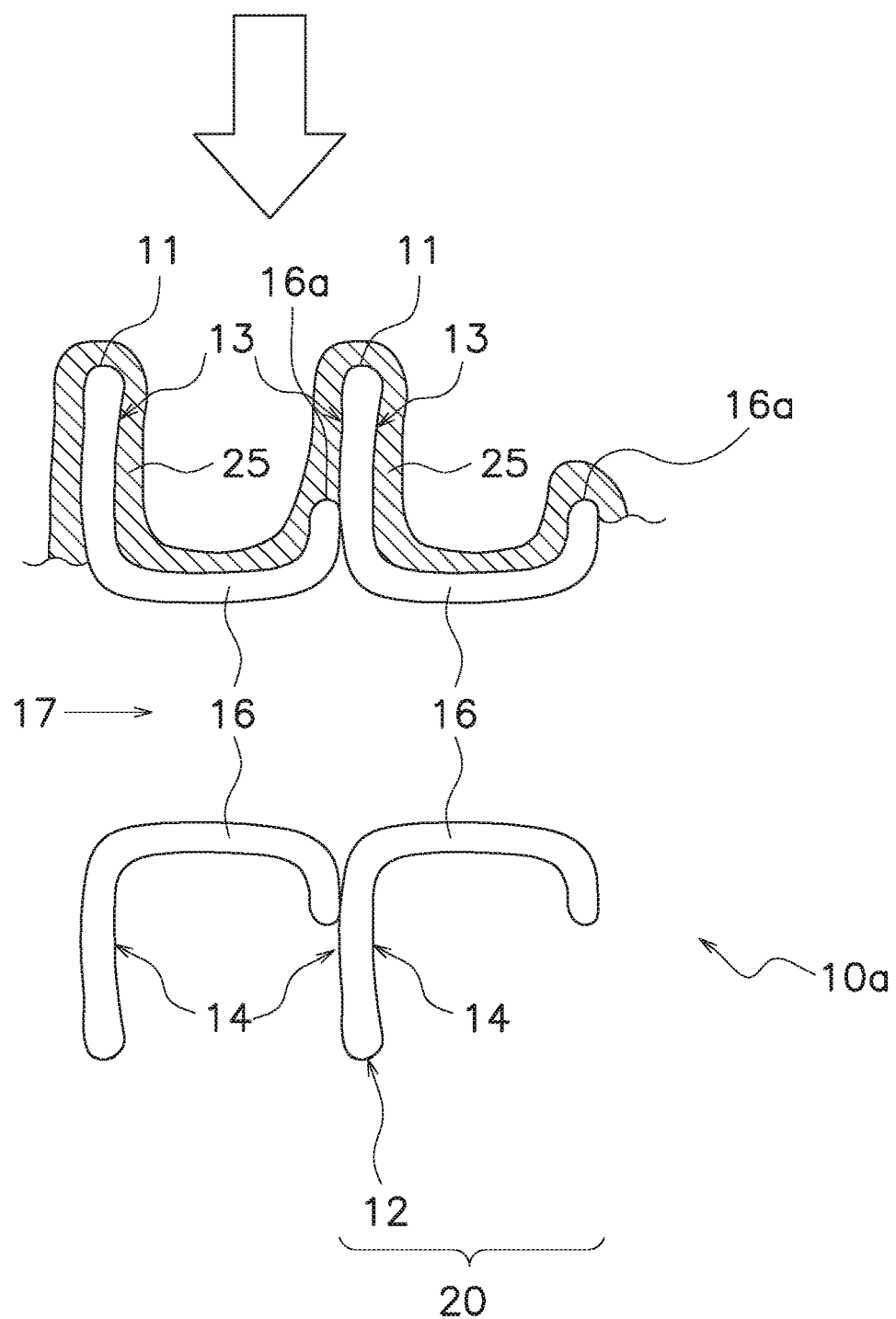
FIG. 7 is a schematic sectional view of the fin 10a of the heat exchanger according to one or more embodiments.

FIG. 5 is a view of the fin 10a disposed on the most windward side in FIG. 4. The schematic view of FIG. 7 corresponds to the sectional view of the fin 10a taken along line B-B in FIG. 5. However, FIG. 7 is a sectional view of a plurality of fins 10a stacked as in the state of being incorporated in the heat exchanger 4. FIG. 6 is a sectional view of a schematic configuration of an organic layer 25 of the fin 10a.

The fin 10 includes a substrate 20 and an organic layer 25.

The substrate 20 has a thickness of 0.05 mm or more and 0.15 mm or less. In one or more embodiments, the thickness may be 0.9 mm or more and 0.12 mm or less. In one or more embodiments, the thickness is about 0.115 mm. The substrate 20 includes aluminum or an aluminum alloy. For example, the substrate 20 may include a material containing aluminum at a content of 95% or more and 99.9% or less.

The substrate 20 has an end face 11 on the windward side, a surface 13 on the windward side, a fin collar 16, a surface 14 on the leeward side, and an end face 12 on the leeward side. The fin collar 16 has an end face 16a of the fin collar.

The substrate 20 is a ribbon-shaped elongated plate, and the holes 17 are formed at regular intervals in the longitudinal direction. In the holes 17, the heat transfer tubes 30 are respectively inserted. The fin collar 16 is formed around each of the holes 17 of the fin 10. The fin collar 16 extends in one direction perpendicular to the surfaces 13 and 14 of the substrate as shown in FIG. 7. By the fin collar 16, the contact between the fin 10 and the heat transfer tubes 30 spreads in a plane. The fin collar 16 has the end face 16a on the side opposite to the surfaces 13 and 14 of the substrate 20.

The organic layer 25 is formed at least on the surface 13 on the windward side of the substrate 20, the end face 11 on the windward side of the substrate 20, and the end face 16a on the windward side of the fin collar. As can be seen from FIG. 7, the organic layer 25 is also formed on the fin collar 16 on the windward side of the fin 10a. The thickness of the organic layer 25 is not always uniform. The film thickness of the organic layer 25 is large on the end face 11 on the windward side of the holes 17 in which the heat transfer tubes are respectively inserted, and the film thickness of the organic layer 25 is small on the end face 12 on the leeward side of the holes 17. The film thickness of the organic layer 25 is larger on the surface of the fin 10a on the most windward side than on the surfaces of the fins 10b and 10c on the leeward side among a plurality of rows of fins 10a to 10c in FIG. 4. In one or more embodiments, the organic layer 25 has a thickness of 65 µm on the end face 11 on the windward side of the substrate 20, and has a thickness of 216 µm at the thickest portion of the organic layer 25 on the surface of the substrate 20. The thickness of the thickest portion of the organic layer 25 on the surface 13 of the substrate 20 is, for example, 10 µm or more and 300 µm or less. In one or more embodiments, the thickness may be 20 µm or more, 50 µm or more, or 100 µm or more. On the end face 11, the film thickness of the organic layer 25 is, for example, 20 µm or more and 100 µm or less. In the present description, a discussion about the range of the film thickness of the organic layer 25 targets the film thickness of the organic layer 25 of the fin 10a on the most windward side unless otherwise specified. One fin 10a is arbitrarily extracted from a plurality of stacked fins 10a excluding the fin at the end portion. The discussion targets the film thickness of the thickest portion on the surface 13 of the substrate 20 of the extracted fin 10a. Hereinafter, the range of the film thickness is discussed in the same manner in the cases of the first organic layer 23, the second organic layer 22, and the third organic layer 21.

The organic layer 25 includes a first organic layer 23, a second organic layer 22, and a third organic layer 21 as shown in FIG. 6.

The first organic layer 23 is formed on the outermost surface in the organic layer 25. The first organic layer is formed on both surfaces of the substrate 20, the end face 11 on the windward side of the substrate 20, and the fin collar 16 on the windward side of the substrate 20 (including the end face 16a of the fin collar). The first organic layer 23 is thickly formed on the surface 13 on the windward side and the end face 11 on the windward side, and is more thinly formed or rarely formed on the surface 14 on the leeward side and the end face 12 on the leeward side. The thickness of the first organic layer 23 is, for example, 10 µm or more and 200 µm or less. The first organic layer 23 includes a hydrophobic organic compound. The first organic layer 23 is one resin or a combination of resins selected from the group consisting of polyurethane-based resins, acrylic-based resins, fluorine-based resins, and polyester-based resins. In one or more embodiments, a polyurethane-based resin is used. A polyurethane-based resin has excellent weather resistance. Furthermore, a polyurethane-based resin is easy to obtain at low cost.

The second organic layer 22 is used between the first organic layer 23 and the substrate 20. The thickness of the second organic layer 22 is, for example, 5 µm or more and 40 µm or less. The second organic layer 22 is used to improve the adhesion between the first organic layer 23 and the substrate 20 or the third organic layer 21 as a base layer. The second organic layer 22 includes a hydrophobic organic compound. The second organic layer is an epoxy-based or epoxy-zinc-based resin. In one or more embodiments using an epoxy-zinc-based resin, an organic layer other than the third organic layer 21 described below may be disposed as a base layer of the second organic layer 22.

The third organic layer 21 is uniformly provided on the surfaces 13 and 14 of the substrate 20. On both the end faces 11 and 12 and on the end face 16a of the fin collar, no third organic layer 21 is disposed. The film thickness of the third organic layer is 0.5 µm or more and 10 µm or less. The third organic layer 21 also includes a hydrophobic organic compound. For example, the third organic layer 21 may be one resin or a combination of resins selected from the group consisting of epoxy-based resins, urethane-based resins, polyester-based resins, acrylic-based resins, and fluorine-based resins. Here, an epoxy-based resin is used.

(4) Method for Manufacturing Fin 10 of Heat Exchanger 4

Figure 8:
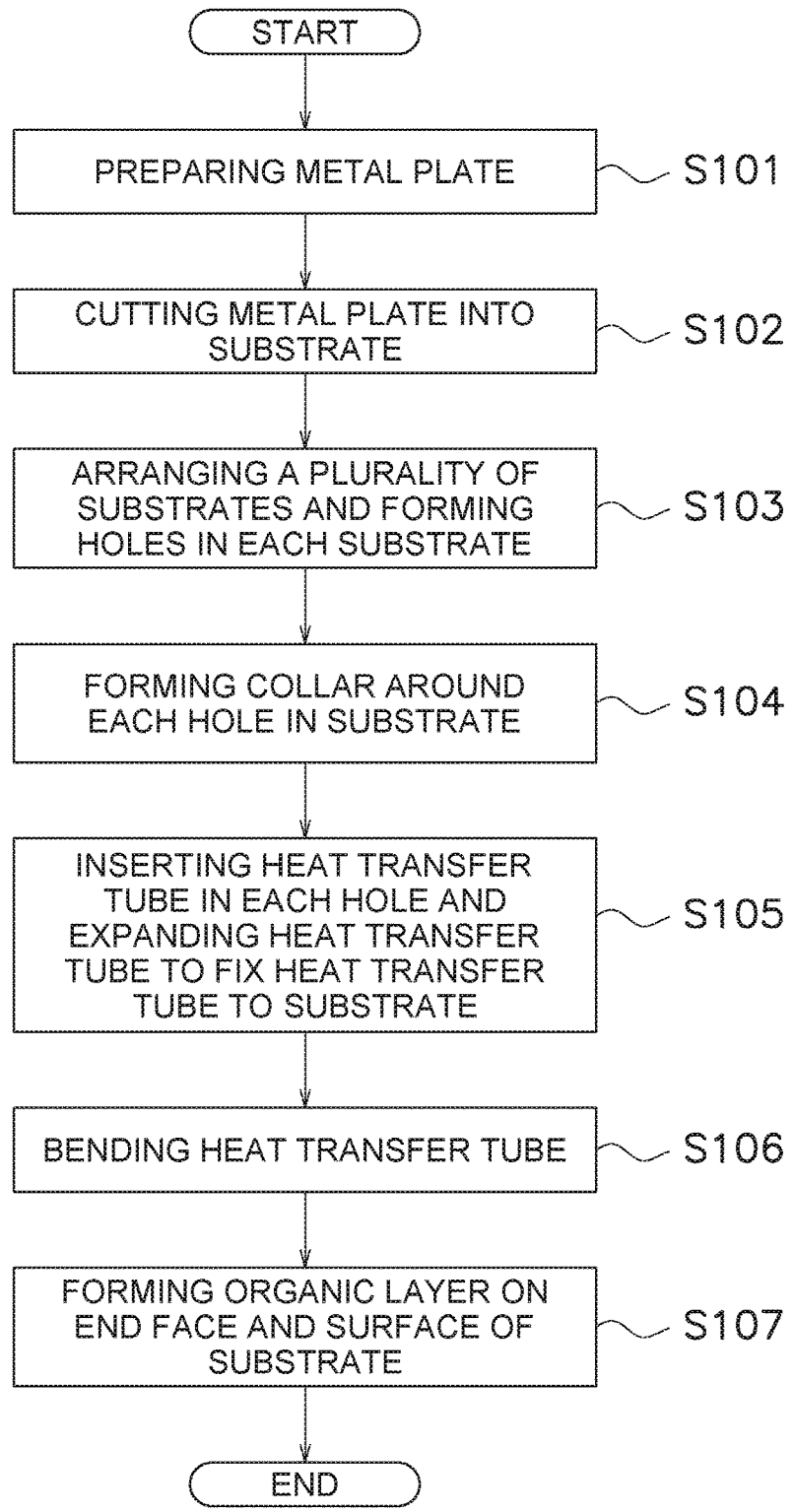
FIG. 8 is a flowchart of a method for manufacturing the fin 10 of the heat exchanger according to one or more embodiments.

Next, a method for manufacturing a fin 10 of a heat exchanger 4 will be described with reference to the drawings. FIG. 8 is a flowchart of a method for manufacturing a heat exchanger.

First, a metal plate is prepared as a material for a substrate 20 (S101). The metal plate has a third organic layer 21 formed on the surface in advance. In one or more embodiments, the third organic layer 21 may be appropriately colored. In one or more embodiments, the third organic layer 21 is colored yellow.

The metal plate is cut into a substrate 20 so that the shape of a fin 10 is a ribbon shape or a rectangle (S102). Thus, no organic layer 25 is disposed on the cut faces (end faces 11 and 12 of the substrate 20) of the metal plate.

Next, a plurality of holes 17 are formed in the rectangular substrate 20 (S103). In each of the plurality of holes 17, a heat transfer tube 30 is to be inserted. After forming the plurality of holes 17, a fin collar 16 is formed around each of the plurality of holes (S104).

Next, a plurality of fins 10 are disposed at regular intervals (of the height of the fin collar 16) so that the plurality of holes 17 of each of the plurality of fins 10 are aligned with the plurality of holes 17 of the next fin 10, and a plurality of heat transfer tubes 30 are respectively inserted in the plurality of holes 17 of each of the plurality of fins 10 (S105).

Next, the plurality of heat transfer tubes 30 are expanded to integrate the plurality of heat transfer tubes 30 and the plurality of fins 10.

Next, a necessary number of composites of the integrated heat transfer tubes 30 and fins 10 are arranged in rows. Then, each heat transfer tube 30 of the necessary number of composites of the integrated heat transfer tubes 30 and fins 10 is bent (S106). In other words, a curved portion 4a of the heat exchanger 4 is formed (see FIG. 2A).

An organic substance is sprayed onto the necessary number of composites of the integrated heat transfer tubes 30 and fins 10 to form an organic layer 25 on the end face 11 and the surface 13 of the substrate 20, or on the fin collar 16 (S107). The thickness of the organic layer is 10 µm or more and 300 µm or less. The direction in which the organic substance is sprayed is the same as the direction in which the air flows in the heat exchanger 4. For example, the direction in which the organic substance is sprayed is the direction of the arrow in FIG. 7. The application of an organic substance is performed in two steps, thus spraying two kinds of organic substances. The organic substance sprayed first is a hydrophobic epoxy-based resin. As a result, a second organic layer 22 is formed. Next, another organic substance is sprayed to form a first organic layer 23. This organic substance is also a hydrophobic organic compound, and is one resin or a combination of resins selected from the group consisting of polyurethane-based resins, acrylic-based resins, and polyester-based resins.

In the step S107, the organic substance is sprayed onto the fins 10a to 10c in three rows. However, in the step S107, the organic layer 25 having a sufficient thickness is formed only in the fin 10a disposed on the most windward side among the fins 10a to 10c disposed in three rows. On the surface of the fin 10a, the organic layer 25 having a sufficient thickness is formed on the portion of the windward side of the surface 13 on the windward side of the plurality of holes 17.

In one or more embodiments, the first organic layer 23 and the second organic layer 22 may be colored differently from the third organic layer 21. In one or more embodiments, the first organic layer 23 and the second organic layer 22 are colored gray, and the third organic layer 21 is colored yellow. By different coloring, the application of the first organic layer 23 and the second organic layer 22 can be easily verified. Furthermore, the boundary can be easily indicated between the portion where the first organic layer 23 and the second organic layer 22 have a sufficient thickness and the portion where the first organic layer 23 and the second organic layer 22 are thin or the portion where no organic layer is applied.

(5) Characteristics (5-1)

According to one or more embodiments, the fin 10 of the heat exchanger 4 includes the substrate 20 and the organic layer 25. The substrate 20 includes aluminum or an aluminum alloy. The organic layer 25 is disposed on the end face 11 of the substrate 20.

No organic layer 25 is conventionally applied to the end face 11 of the substrate. In one or more embodiments, the effect of preventing corrosion of the substrate 20 is large because of the organic layer 25 disposed on the end face 11 of the substrate 20.

In one or more embodiments, the organic layer 25 is also disposed on the end face 16a of the fin collar on the windward side of the substrate 20. Because of the organic layer 25 disposed on the end face 16a of the fin collar on the windward side of the substrate 20, the effect of preventing corrosion of the substrate 20 is large.

(5-2)

In one or more embodiments, the organic layer 25 is disposed on the end face 11 of the substrate 20 and the surface 13 of the substrate continuous from the end face.

Because of the organic layer 25 formed also on the surface 13 of the substrate 20, the effect of preventing corrosion of the substrate 20 is large.

(5-3)

In the fin 10 of the heat exchanger according to one or more embodiments, the organic layer 25 has a film thickness of 10 µm or more and 300 µm or less on the surface of the substrate.

The organic layer 25 having a thickness of 10 µm or more disposed on the surface 13 closer to the end face 11 of the substrate 20 has a sufficient effect of preventing corrosion.

The organic layer 25 having a thickness of more than 300 µm deteriorates the heat transfer performance of the fin 10.

(5-4)

The organic layer 25 according to one or more embodiments includes the first organic layer 23 including a hydrophobic organic compound. The hydrophobic organic compound is disposed on the outermost surface of the organic layer. The word "hydrophobic" means, for example, to have a contact angle with water of 50° or more.

The fin 10 according to one or more embodiments is suitable for the outdoor heat exchanger 4 used in the cooling-only air conditioning apparatus 100. In the case of an air conditioning apparatus switchable between cooling and heating, the outdoor heat exchanger is used as an evaporator during heating. In such a case, the organic layer 25 used for coating the fin 10 is suitably hydrophilic. The reason is that in the case of a hydrophobic coating, an evaporator, which may frost on the fin, has a poor draining property because the water content of the frost agglomerates. Meanwhile, a cooling-only air conditioning apparatus has no possibility of frost formation in the outdoor heat exchanger. In the case of using under a salty and moist environment, a hydrophobic coating has an effect of preventing corrosion by preventing salt-containing moisture from adhering to the fin.

The hydrophobic first organic layer is one resin or a combination of resins selected from the group consisting of polyurethane-based resins, acrylic-based resins, fluorine-based resins, and polyester-based resins. Polyurethane-based resins may be used in one or more embodiments. A polyurethane-based resin has excellent weather resistance. Furthermore, a polyurethane-based resin is easy to obtain at low cost.

(5-5)

The organic layer 25 further has the hydrophobic second organic layer 22. The second organic layer 22 is disposed between the first organic layer 23 and the substrate 20. The second organic layer is an epoxy-based or epoxy-zinc-based resin. The thickness of the second organic layer is 5 µm or more and 40 µm or less.

The second organic layer 22 improves the adhesion between the first organic layer 23 and the substrate 20 or the third organic layer 21.

(5-6)

The end face 11 on which the organic layer 25 according to one or more embodiments is formed is on the windward side. In the case that a plurality of fins 10a to 10c are arranged in a plurality of rows from the windward side to the leeward side, the end face 11 is on the windward side of the fin 10a arranged on the most windward side.

The fin 10a on the uppermost stream side (i.e., the most upstream side of the air flow) includes the organic layer 25 having an average thickness of 10 µm or more. The fin 10b on the midstream side and the fin 10c on the downstream side each include the organic layer 25 having an average thickness of 10 µm or less.

If the heat exchanger is exposed to an environment of air containing a large amount of salt and water, the end face 11 on the windward side demands corrosion resistance the most severely. Therefore, the organic layer having a sufficient thickness disposed on the end face 11 on the windward side has a sufficient effect of preventing corrosion.

(5-7)

The first organic layer 23 and the second organic layer 22 are disposed also on the surface 13 on the windward side of the substrate 20.

The first organic layer 23 and the second organic layer 22 disposed not only on the end face 11 but also on the surface 13 on the windward side has a further sufficient effect of preventing corrosion.

(5-8)

The organic layer 25 according to one or more embodiments further has the third organic layer 21. The third organic layer is disposed on the substrate. In the case that the organic layer 25 has the first organic layer and the second organic layer, the third organic layer is disposed closer to the substrate than the first organic layer and the second organic layer are. The third organic layer is a hydrophobic epoxy-based resin. The thickness of the third organic layer is 0.5 µm or more and 10 µm or less. The thickness of the third organic layer is relatively uniform. The third organic layer is also called precoat because it is usually applied before substrate processing.

On the end face of the substrate, the fin collar, and the like, no third organic layer 21 is formed.

The third organic layer is one resin or a combination of resins selected from the group consisting of epoxy-based resins, urethane-based resins, polyester-based resins, acrylic-based resins, and fluorine-based resins. As the third organic layer, an epoxy-based resin may be used in one or more embodiments. If the third organic layer is the same epoxy-based resin as the second organic layer, the third organic layer has high adhesion with the second organic layer. The third organic layer is hydrophobic, so that it has an effect of preventing corrosion in the portion where almost no first organic layer and second organic layer are formed, such as the leeward side of the fin. Therefore, when used in an outdoor heat exchanger of a cooling-only air conditioning apparatus, the third organic layer has a high effect of preventing corrosion.

(5-9)

The method for manufacturing a fin of a heat exchanger according to one or more embodiments includes the steps (a) to (c). In the step (a), a metal plate including aluminum or an aluminum alloy is prepared (S101). The metal plate may have, for example, a third organic layer applied in advance (precoated). In the step (b), the metal plate is cut into a substrate (S102). In the step (c), an organic layer is formed on the surface and the cut face of the substrate 20 (S107).

In the method for manufacturing a fin of a heat exchanger according to one or more embodiments, a substrate is cut, and then an organic layer is formed on the cut face of the substrate. If, in the reverse manner, a substrate is cut after forming an organic layer on the surface of the substrate, no organic layer is formed on the cut face. In the method for manufacturing a fin of a heat exchanger according to one or more embodiments, the substrate has the organic layer on the cut face, resulting in a high effect of preventing corrosion of the substrate.

In the step (c), the organic layer is formed by a spraying method. In the spraying, an organic substance is sprayed toward the end face of the substrate from the windward side of the heat exchanger.

The organic substance applied by the spraying method has nonuniform film thicknesses. However, the spraying method enables to form an organic film layer having thicknesses depending on the portions. In the fin 10a according to one or more embodiments, the organic layer 25 can be formed thickly on the surface 13 on the windward side more exposed to air containing salt and water. Meanwhile, the organic layer 25 is formed thinly on the surface 14 on the leeward side. If an organic layer is thickly formed in this portion, the heat exchange efficiency is deteriorated.

The organic layer formed in the step (c) has a hydrophobic first organic layer on the outermost surface. Therefore, when used in an outdoor heat exchanger of a cooling-only air conditioning apparatus, the organic layer has a high effect of preventing corrosion for the same reason as described in the item (5-4).

The first organic layer is one resin or a combination of resins selected from the group consisting of polyurethane-based resins, acrylic-based resins, fluorine-based resins, and polyester-based resins.

(5-10)

The method for manufacturing a fin of a heat exchanger according to one or more embodiments further includes the steps (d), (e), (f), and (g).

In the step (d), a plurality of holes are formed in the substrate (S103). The step (d) is after the step (a) and before the step (c).

In the step (e), a plurality of fin collars are formed in the substrate (S104). The step (e) is after the step (d) and before the step (c).

In the step (f), a heat transfer tube is inserted in each of the plurality of holes and expanded to integrate the fin and the heat transfer tube (S105). The step (f) is after the step (e) and before the step (c).

In the step (g), the heat transfer tube integrated with the fin is bent (S106). The step (g) is after the step (f) and before the step (c).

In the method for manufacturing a fin of a heat exchanger according to one or more embodiments, the steps (a), (b), (d), (e), (f), (g), and (c) are performed in this order. In all cases, a metal plate is cut into a substrate, and then an organic layer is formed on the cut face of the substrate. Therefore, the substrate has the organic layer on the cut face, resulting in a high effect of preventing corrosion of the substrate.

(5-11)

In the step (c) in the method for manufacturing a fin of a heat exchanger according to one or more embodiments, the organic layer 25 is formed thicker on the surface 13 on the windward side of the substrate 20 than on the surface 14 on the leeward side.

Therefore, in the fin 10a according to one or more embodiments, the organic layer 25 is formed thickly on the surface 13 on the windward side more exposed to air containing salt and water, and as a result, the effect of preventing corrosion is high. Furthermore, by forming the organic layer 25 further thinly on the surface 14 on the leeward side, deterioration in the heat exchange efficiency can be prevented.

The organic layer on the surface on the windward side of the substrate has a thickness of 10 μm or more and 300 μm or less. By forming the organic layer having a film thickness of 10 μm or more, the effect of preventing corrosion can be further enhanced.

(6) Modifications (6-1) Modification 1A

Figure 9:
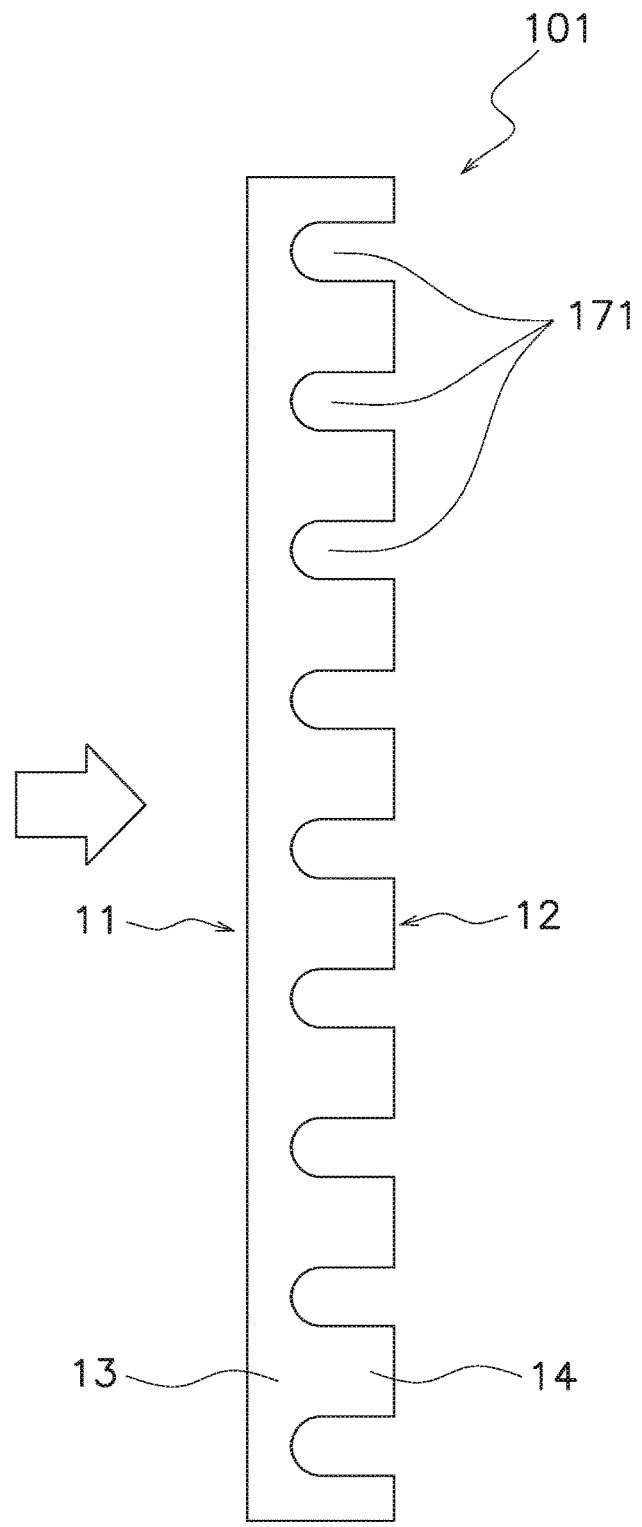
FIG. 9 is a plan view of a fin 101 of a heat exchanger according to Modification 1A of one or more embodiments.

In one or more embodiments, the substrate 20 of each fin 10 has the holes 17 in which the heat transfer tubes 30 are respectively inserted. The holes 17 may lead to the end of the substrate 20. In other words, for example, cutout portions may be formed in place of the holes. As illustrated in FIG. 9, a fin 101 according to Modification 1A has cutout portions 171 rather than the holes 17. Modification 1A is similar to the above-described embodiments except for this configuration.

In the fin 101 according to the Modification 1A, the effect of preventing corrosion of the substrate 20 is large because of the organic layer 25 disposed on the end face 11 and the surface 13 on the windward side of the substrate 20. The fin 101 according to Modification 1A also produces a similar effect to that described in the item (5).

(6-2) Modification 1B

In one or more embodiments, as shown in FIG. 1, one outdoor heat exchanger 4 and one indoor heat exchanger 6 are connected to one refrigerant circuit. In Modification 1B, a plurality of indoor heat exchangers are connected to one refrigerant circuit. Modification 1B is similar to the above-described embodiments except for this configuration. Also in Modification 1B, a similar effect to that in the above-described embodiments can be obtained.

Also in the case that a plurality of outdoor heat exchangers 4 are connected to one refrigerant circuit and in the case that a plurality of outdoor heat exchangers 4 and a plurality of indoor heat exchangers 6 are connected to one refrigerant circuit, a similar effect to that in the above-described embodiments can be obtained.

(6-3) Modification 1C

In one or more embodiments, the fin is a waffle fin. In Modification 1C, the fin is a cut-and-bent fin. Modification 1C is similar to the above-described embodiments except for this configuration. Also in Modification 1C, a similar effect to that in the above-described embodiments can be obtained.

(6-4) Modification 1D

In one or more embodiments, the heat exchanger 4 has one curved portion 4a. In Modification 1D, the heat exchanger 4 has no curved portion 4a. In other words, the shape of the heat exchanger 4 has only the linear portion 4b. Modification 1D is similar to the above-described embodiments except for this configuration. Also in Modification 1D, a similar effect to that in the above-described embodiments can be obtained.

In Modification 1D, the step S106 of bending the heat transfer tube is not used in the method for manufacturing a fin of a heat exchanger. Therefore, the organic layer may be formed on the substrate (S107) after expanding the heat transfer tube to fix the heat transfer tube to the substrate (S105).

(6-5) Modification 1E

In one or more embodiments, the heat exchanger 4 has one curved portion 4a. In Modification 1E, the heat exchanger 4 has two curved portions 4a. The heat exchanger 4 is bent at two portions and disposed along the three (left, rear, and right) side faces of the casing 2 of the outdoor unit 50. The fan 3 is disposed in the upper part of the casing 2, and the air heat-exchanged by the heat exchanger 4 is blown out upward from the upper part of the casing 2. Modification 1E is similar to the above-described embodiments except for this configuration. Also in Modification 1E, a similar effect to that in the above-described embodiments can be obtained.

The heat exchanger 4 may be disposed along the four side faces of the casing 2 of the outdoor unit 50.

Although the disclosure has been described with respect to only a limited number of embodiments, those skilled in the art, having benefit of this disclosure, will appreciate that various other embodiments may be devised without departing from the scope of the above-described embodiments. Accordingly, the scope of the above-described embodiments should be limited only by the attached claims.

REFERENCE SIGNS LIST

1: Compressor
2: Casing
3, 7: Fan
4: Outdoor heat exchanger
5: Expansion valve
6: Indoor heat exchanger
10, 10a to 10c, 101: Fin 11: End face on windward side
12: End face on leeward side
13: Surface on windward side
14: Surface on leeward side
16: Fin collar
17: Hole
171: Cutout portion
20: Substrate
21: Third organic layer
22: Second organic layer
23: First organic layer
25: Organic layer
30: Heat transfer tube
50: Outdoor unit
100: Air conditioning apparatus

The invention claimed is:

1. A fin of a heat exchanger comprising:
a substrate including aluminum or an aluminum alloy, wherein the substrate comprises a plurality of holes or a plurality of cutout portions in which a plurality of heat transfer tubes are to be disposed respectively; and
an organic layer disposed on an end face of the substrate, wherein the organic layer includes a first organic layer, a second organic layer, and a third organic layer,
wherein the second organic layer and the first organic layer are disposed on the end face of the substrate in order from a substrate side,
wherein the third organic layer, the second organic layer, and the first organic layer are disposed on a windward surface or a leeward surface of the substrate in order from the substrate side.

2. The fin of the heat exchanger according to claim 1, wherein the second organic layer and first organic layer are disposed, directly or indirectly, also on the windward or leeward surface of the substrate that is continuous from the end face of the substrate.

3. The fin of the heat exchanger according to claim 2, wherein the organic layer has a film thickness of 10 μm or more and 300 μm or less on the surface of the substrate.

4. The fin of the heat exchanger according to claim 1, wherein the first organic layer is hydrophobic and has a thickness of 10 μm or more and 200 μm or less.

5. The fin of the heat exchanger according to claim 4, wherein the first organic layer is one resin or a combination of resins selected from the group consisting of polyurethane-based resins, acrylic-based resins, fluorine-based resins, and polyester-based resins.

6. The fin of the heat exchanger according to claim 4, wherein the first organic layer is a polyurethane-based resin.

7. The fin of the heat exchanger according to claim 4, wherein the second organic layer is a hydrophobic epoxy-based or epoxy-zinc-based resin.

8. The fin of the heat exchanger according to claim 7, wherein the second organic layer has a thickness of 5 μm or more and 40 μm or less.

9. The fin of the heat exchanger according to claim 7, wherein
the third organic layer is one resin or a combination of resins selected from the group consisting of epoxy-based resins, urethane-based resins, polyester-based resins, acrylic-based resins, and fluorine-based resins.

10. The fin of the heat exchanger according to claim 9, wherein
the second organic layer and the first organic layer continuously cover the end face of the substrate and a surface of the third organic layer.

11. The fin of the heat exchanger according to claim 1, wherein the end face is disposed on a windward side of the substrate.

12. The fin of the heat exchanger according to claim 1, wherein
the substrate further comprises a fin collar that extends in one direction perpendicular to the surface of the substrate and that is disposed around each of the plurality of holes or at a periphery of each of the plurality of cutout portions, and
the organic layer is disposed on at least a part of an end face of the fin collar.

13. A heat exchanger comprising:
a plurality of rows of composites on an upstream side and a downstream side of an air flow,
each of the plurality of rows of composites comprises:
a plurality of the fins according to claim 1, and
a plurality of heat transfer tubes respectively passing through the plurality of holes or the plurality of cutout portions of each of the plurality of the fins, wherein
the plurality of heat transfer tubes are integrated with the plurality of the fins, and
the organic layer has an average thickness of 10 μm or more on fins at a most upstream side of the air flow, and has an average thickness of 10 μm or less on fins at a most leeward side of the air flow.

14. An air conditioning apparatus comprising:
the heat exchanger according to claim 13; and
a fan configured to feed air to the heat exchanger, wherein the heat exchanger is an outdoors.

15. The fin of the heat exchanger according to claim 1, wherein the organic layer is formed on the surface with a thickness on a windward side of the substrate that is greater than a thickness on a leeward side of the substrate.

16. A method for manufacturing a fin of a heat exchanger, the method comprising:
step (a) of preparing a metal plate including aluminum or an aluminum alloy having a third organic layer on a surface of the metal plate;
step (b) of cutting the metal plate into a substrate; and
step (c) of forming a first and a second organic layers on the third organic layer and a cut face of the substrate,
wherein the second organic layer and the first organic layer are disposed on an end face of the substrate in order from a substrate side,
wherein the third organic layer, the second organic layer, and the first organic layer are disposed on a windward or a leeward surface of the substrate in order from the metal plate, such that the third organic layer applied to a surface of the aluminum or the aluminum alloy.

17. The method for manufacturing the fin of the heat exchanger according to claim 16, further comprising, after step (a) but before step (c),
step (d) of forming a plurality of holes or a plurality of cutout portions in the substrate.

18. The method for manufacturing the fin of the heat exchanger according to claim 17, further comprising, after step (d) but before step (c),
step (e) forming a plurality of fin collars in the substrate.

19. The method for manufacturing the fin of the heat exchanger according to claim 18, further comprising, after step (e) but before step (c),
step (f) inserting a heat transfer tube in each of the plurality of holes or plurality of cutout portions and expanding the heat transfer tube to integrate the fin and the heat transfer tube.

20. The method for manufacturing the fin of the heat exchanger according to claim 19, further comprising, after step (f) but before step (c),
   step (g) bending the heat transfer tube integrated with the fin.

21. The method for manufacturing the fin of the heat exchanger according to claim 16, wherein
   the first organic layer is hydrophobic.

22. The method for manufacturing the fin of the heat exchanger according to claim 21, wherein
   the first organic layer is one resin or a combination of resins selected from the group consisting of polyurethane-based resins, acrylic-based resins, fluorine-based resins, and polyester-based resins.

23. The method for manufacturing the fin of the heat exchanger according to claim 16, wherein
   in step (c), the organic layer is formed on the surface with a thickness on a windward side of the substrate that is greater than a thickness on a leeward side of the substrate.

24. The method for manufacturing the fin of the heat exchanger according to claim 23, wherein, in the organic layer on the surface, the thickness on the windward side of the substrate is 10 µm or more and 300 µm or less.

* * * * *